United States Patent [19]
Winkler et al.

[11] 3,950,773
[45] Apr. 12, 1976

[54] OPERATING MEANS FOR PHOTOGRAPHIC CAMERAS

[75] Inventors: Alfred Winkler, Munich; Dieter Engelsmann, Unterhaching, both of Germany

[73] Assignee: AGFA-Gevaert, A.G., Leverkusen, Germany

[22] Filed: Mar. 24, 1972

[21] Appl. No.: 237,986

Related U.S. Application Data
[63] Continuation of Ser. No. 749,170, July 31, 1968, abandoned.

[30] Foreign Application Priority Data
Feb. 16, 1968 Germany............................ 1622174

[52] U.S. Cl................................. 354/266; 354/234
[51] Int. Cl. ............................................ G03b 17/00
[58] Field of Search ............ 95/11 R, 11.5 R, 31 R, 95/31 EL; 200/159 B, 168 G, 61.2, 61.21; 354/266

[56]       References Cited
          UNITED STATES PATENTS
163,753    5/1975    Duerden........................ 200/159 B

| 1,789,017 | 1/1931 | Munthesen ..................... 200/168 G |
| 2,051,654 | 8/1936 | Sanford et al.................. 200/159 B |
| 3,049,603 | 8/1962 | Flatt et al. ..................... 200/168 G |
| 3,183,520 | 5/1965 | Schaefer ............................. 352/179 |
| 3,502,013 | 3/1970 | Shimoda ............................. 95/31 R |

Primary Examiner—Samuel S. Matthews
Assistant Examiner—Russell E. Adams, Jr.
Attorney, Agent, or Firm—Michael S. Striker

[57]          ABSTRACT

The shutter of a photographic camera is released in response to deformation of a diaphragm which thereby closes a microswitch to energize an electromagnet which effects release of the shutter. Alternatively, deformation of the diaphragm brings about pivotal movement of a lever which releases the shutter. The diaphragm can act directly against a movable contact of the microswitch or against one arm of the lever, or it transmits motion by way of a metallic platelike back support which protects it against excessive deformation.

31 Claims, 5 Drawing Figures

OPERATING MEANS FOR PHOTOGRAPHIC CAMERAS

This is a continuation, of application Ser. No. 749,170 filed July 31, 1968 now abandoned.

BACKGROUND OF THE INVENTION

The present invention relates to photographic apparatus in general, and more particularly to improvements in operating means for still cameras or motion picture cameras. Still more particularly, the invention relates to improvements in operating means which can bring about release of the shutter, energization of an exposure meter, operation of a film transporting mechanism and/or operation or actuation of another camera mechanism wherein a motion receiving part must be displaced in order to trigger a certain operation.

In conventional cameras, the shutter is released in response to depression of a trigger. Depression of the trigger often causes so-called camera shake because many photographers are incapable of releasing the shutter steadily enough at 1/60-th or even at 1/125-th of a second. This affects the sharpness of exposures.

SUMMARY OF THE INVENTION

One of the objects of our invention is to provide a novel and improved operating means for photographic apparatus which is constructed and mounted in such a way that even an inexperienced photographer can make satisfactory exposures without camera shake at relatively slow shutter speeds.

Another object of the invention is to provide a novel operating means for shutter mechanisms of still cameras or motion picture cameras.

A further object of the invention is to provide an operating means which can release the shutter mechanically or by completion of an electric circuit.

An additional object of the invention is to provide a simple, compact and inexpensive operating means which can be used with equal advantage in popularly priced as well as in expensive photographic apparatus.

Still another object of the invention is to provide an operating means which can be actuated with exertion of a minimal force and which requires a minimal displacement in order to initiate the release of a shutter and/or to trigger the operation of another camera mechanism.

A concomitant object of the invention is to provide an operating means which is sufficiently rugged to warrant its use in cameras for beginners as well as in cameras for advanced photographers.

Briefly outlined, the invention is embodied in a photographic camera which comprises a housing and comprises at least one camera mechanism (e.g., the shutter mechanism, the film transporting mechanism, the exposure meter and/or others) which has a motion receiving portion movable from a first to a second position to thereby trigger the operation or functioning of the respective mechanism. In accordance with our invention, the operating means comprises a flexible diaphragm which is mounted in the housing and is deformable, preferably by hand, to thereby effect (either directly or indirectly) movement of the motion receiving portion from first to second position. For example, the camera mechanism may comprise a microswitch which includes a movable contact and a second contact. The movable contact constitutes the motion receiving portion of the mechanism and is moved against the second contact in response to deformation of the diaphragm to thereby complete the circuit of an electromagnet which can release the shutter, start the motor of the film transporting mechanism and/or complete the circuit of the exposure meter which can but need not adjust the diaphragm.

In order to protect the diaphragm against excessive localized deformation by an inexperienced or careless user, the camera may further comprise a substantially rigid preferably plate-like back support which normally abuts against one side of the diaphragm and effects movement of the motion receiving portion in response to deformation of the diaphragm. Such back support may be mounted in a socket which is installed in a wall of the camera housing and also accommodates the marginal portion of the diaphragm. If desired, deformation of the diaphragm can be used to effect pivotal or other movements of a lever or the like which thereby actuates the respective mechanism or mechanisms. For example, one arm of a two-armed lever which is pivotally mounted in the housing can be pivoted by the back support in response to deformation of the diaphragm whereby the other arm of the lever releases the shutter. The back support preferably transmits motion to the one arm by way of an intermediate motion transmitting member, for example, by way of a bolt or screw which meshes with and is adjustable relative to the one arm.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
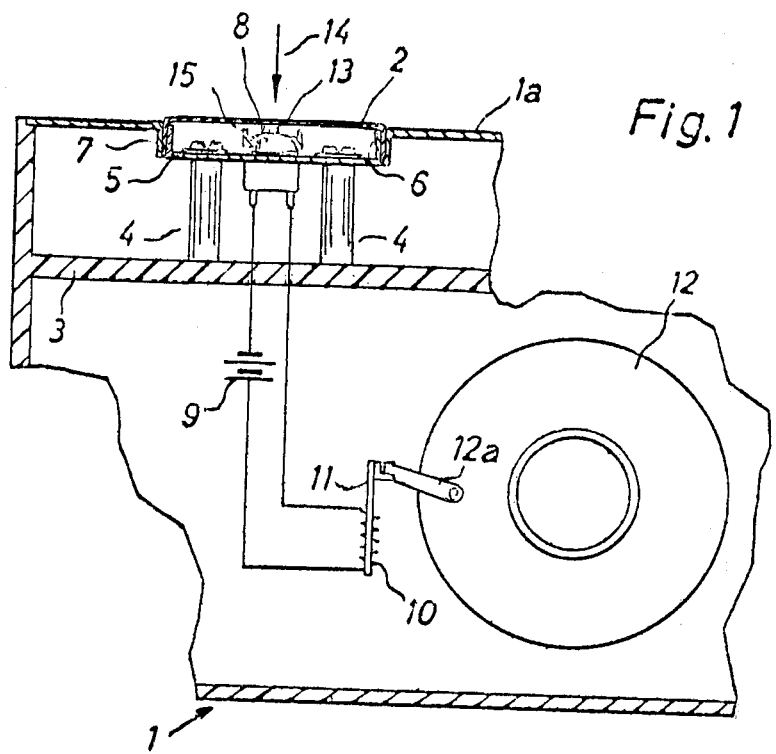
FIG. 1 is a fragmentary schematic vertical sectional view of a still camera wherein the operating means comprises a diaphragm which is mounted in the top wall of the camera housing and serves to complete an electric circuit which causes release of the shutter.
Figure 2:
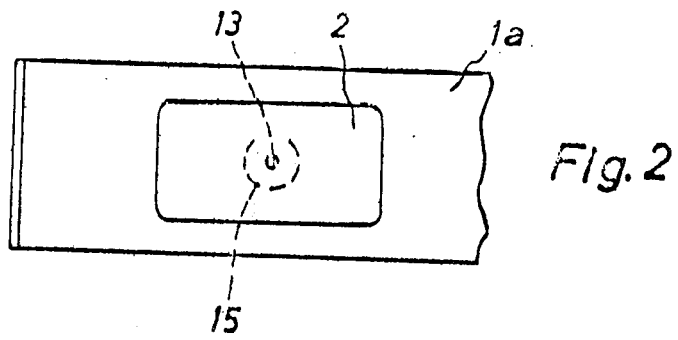
FIG. 2 is a fragmentary top plan view of the camera, substantially as seen in the direction of arrow 14 in FIG. 1.

Referring first to FIGS. 1 and 2, there is shown a portion of a photographic camera having a body or housing 1 which includes a top wall 1a having an opening for an operating means 2 for the shutter 12. The operating means 2 is a rectangular diaphragm which overlies the opening in the top wall 1a and whose circumferentially complete marginal portion is clamped by a strap 7 and is located in the interior of the housing 1. The latter has an internal wall or partition 3 which carries several upwardly extending distancing sleeves 4 supporting a platform or carrier 5 having an annular rim 6 which is surrounded by the marginal portion of the diaphragm 2. This marginal portion is surrounded by the aforementioned strap 7 which causes it to bear against the external surface of the rim 6. The strap 7 cooperates with the marginal portion of the diaphragm 2 and with the carrier 5 to prevent entry of foreign matter into the housing 1.

The shutter mechanism of the camera comprises a microswitch 8 which is installed on the platform 5 immediately below the central portion of the diaphragm 2. The microswitch 8 forms part of an electric circuit which further includes a battery 9 or an analogous energy source and an electromagnet 10 having a reciprocable armature 11 which is coupled to a lever 12a of the shutter 12. When the microswitch 8 is closed by the diaphragm 2, the electromagnet 10 is energized and its armature 11 opens the shutter 12. The central portion of the diaphragm 8 is adjacent to a pin-shaped movable contact 13 of the microswitch 8 and a very small pressure against the outer side of the diaphragm (in the direction indicated by arrow 14) suffices to close the microswitch 8 and to thus open the shutter. The second contact of the microswitch 8 is connected to one of the two conductors which connect the microswitch in circuit with the battery 9 and electromagnet 10. The diaphragm 2 is preferably made of elastically deformable material so that it automatically reassumes the illustrated unstressed position when the pressure against its outer side is terminated whereby the microswitch 8 opens and de-energizes the electromagnet 10. The movable contact 13 constitutes a motion receiving portion of the shutter mechanism 8–13 and is moved from a first to a second position in response to very small deformation of the central portion of the diaphragm 2.

In order to avoid excessive flexing of the diaphragm 2, the camera of FIGS. 1 and 2 is further provided with an adjustable sleeve-like internally threaded abutment or stop 15 which is in mesh with an externally threaded portion of the casing of the microswitch 8 and is adjustable between the inner side of the diaphragm and the carrier 5. The stop 15 protects the diaphragm 2 against damage and also prevents transmission of excessive stresses to the movable contact 13 of the microswitch 8.

FIG. 1 shows that the main portion of the diaphragm 2 is flush with the wall 1a of the housing 1. This is advisable because it reduces the likelihood of damage to the diaphragm. The latter may consist of rubber, synthetic plastic or metallic material.

It is clear that the microswitch 8 may open or complete two or more circuits in the camera. For example, the microswitch 8 may be used to complete the circuit of an exposure meter, of a motor which drives the shutter and the film transporting mechanism of a motion picture camera and/or to perform other functions in addition to or instead of actuating the shutter.

Figure 3:
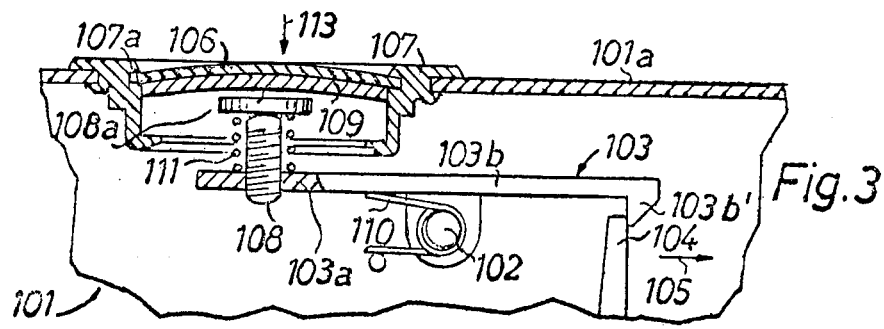
FIG. 3 is a fragmentary vertical sectional view of a second camera wherein the diaphragm effects release of the shutter by mechanical means including a reciprocable back support.

FIG. 3 illustrates a second photographic camera having a housing 101 including a top wall 101a. The housing 101 accommodates and supports a horizontal pivot member 102 for a two-armed lever 103 which is biased by a torsion spring 110 so that it tends to turn in a clockwise direction. The left-hand arm 103a of the lever 103 constitutes the motion receiving portion of a shutter mechanism and meshes with an adjustable motion transmitting bolt 108. The right-hand arm 103b of the lever 103 is provided with a projection or hook 103b' which normally engages an actuating member 104 for the shutter. When the shutter (not shown) is cocked, the actuating member 104 assumes the position shown in FIG. 3 and is held by the projection 103b' to maintain the shutter in cocked position. When the lever 103 is pivoted in a counterclockwise direction, the projection 103b' moves away from the actuating member 104 and the latter is free to pivot or slide in the direction indicated by arrow 105 to thereby release the shutter. The actuating member 104 can also serve as a means for completing the circuit of an exposure meter and is biased by one or more springs (not shown) which tend to move it in the direction indicated by arrow 105. When the exposure is completed, the shutter is cocked by hand or in response to manipulation of the film transporting mechanism whereby the actuating member 104 automatically returns into engagement with and is held by the projection 103b'. It will be seen that the member 104 performs the function of the lever 12a shown in FIG. 1; however, and as mentioned above, the member 104 can also perform one or more additional functions.

The operating means of the camera shown in FIG. 3 again comprises a flexible diaphragm 106 which preferably consists of elastic synthetic plastic material and is installed in an annular socket 107 which is mounted in an opening of the top wall 101a. The socket 107 has an internal annular groove 107a which accommodates the marginal portion of the diaphragm 106. As shown in FIG. 3, the diaphragm is of concavo-convex shape and is recessed into the socket 107 so that it is less likely to be damaged by careless handling of the camera.

The aforementioned motion transmitting bolt 108 has a rounded head 108a which abuts against the inner side of a substantially rigid concavo-convex metallic plate-like back support 109 which is reciprocable in the socket 107 and normally abuts with its convex external surface against the concave internal surface of the diaphragm 106. The torsion spring 110 urges the head 108a against the back support 109 so that the latter bears slightly against the diaphragm 106 and maintains it in the idle or undeformed position shown in FIG. 3. If desired, the camera may further comprise a relatively weak spring 111 which operates between the left-hand arm 103a of the lever 103 and the head 108a of the motion transmitting bolt 108 to compensate for eventual play between the external threads of the bolt and the internal threads of the arm 103a.

The bias of the springs 110, 111 upon the back support 109 can be adjusted by changing the axial position of the motion transmitting bolt 108. The purpose of the back support 109 is to prevent excessive deformation of the diaphragm 106 and to insure uniform distribution of stresses to all portions of the diaphragm. This is necessary when the operator exerts pressure against the outer side of the diaphragm 106 in a region which is not in registry with the head 108a of the motion transmitting bolt 108, i.e., if the pressure is transmitted close to the groove 107a. It is preferred to select the convexity of the back support 109 in such a way that its external surface is complementary to the internal surface of the diaphragm 106 in unstressed condition.

In order to make an exposure, the operator exerts a very slight pressure in the direction indicated by arrow 113 whereby the diaphragm 106 displaces the back support 109 and bolt 108 so that the lever 103 pivots in a counter-clockwise direction and the projection 103b' of its right-hand arm 103b releases the actuating member 104 which then actuates the shutter and/or completes the circuit of the exposure meter. A minimal deformation of the diaphragm 106 suffices to displace the bolt 108 to an extent which is necessary to disengage the projection 103b' from the actuating member 104. The deformation which is necessary to release the actuating member 104 in response to pressure applied in the direction indicated by arrow 113 can be reduced still further if the arm 103b is longer than the arm 103a, i.e., if the distance between the bolt 108 and the pivot member 102 is less than the distance between the pivot member 102 and the projection 103b'.

An advantage of the structure shown in FIG. 3 is that an inexperienced photographer cannot cause excessive localized deformation of the diaphragm 106. This is due to the provision of the back support 109 which thus prevents premature destruction or permanent deformation of the diaphragm by careless handling. FIG. 3 further shows that the diaphragm need not be used to close a microswitch but that it can operate a camera mechanism by effecting displacement of a motion receiving portion (i.e., of the arm 103a of the lever 103) by mechanical means.

Figure 4:
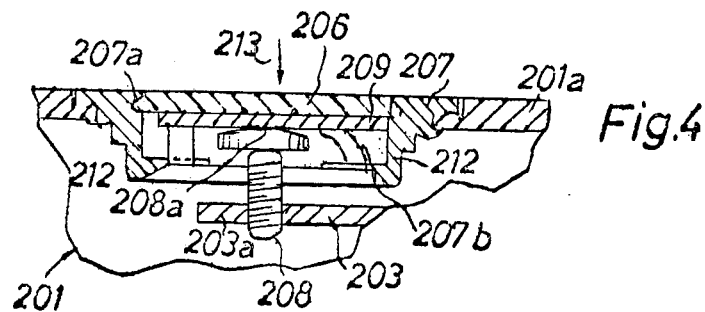
FIG. 4 is a similar fragmentary sectional view of a third camera which constitutes a modification of the camera shown in FIG. 3.

FIG. 4 illustrates a portion of a third camera which is very similar to the camera of FIG. 3. The main difference is that the socket 207 is fully recessed into the top wall 201a of the housing 201 and that the diaphragm 206 is flush with the wall 201a. Also, the spring 111 of FIG. 3 is replaced with a set of leaf springs 212 which operate between an inwardly extending shoulder 207b of the socket 207 and the inner side of a flat plate-like back support 209. The manner in which the motion transmitting bolt 208 can pivot the arm 203a of the lever 203 in response to pressure applied against the outer side of the diaphragm 206 in the direction indicated by arrow 213 is the same as described in connection with FIG. 3. The numeral 207a denotes an internal annular groove provided in the socket 207 to accommodate the marginal portion of the diaphragm 206. The bolt 208 has a rounded head 208a which abuts against the inner side of the back support 209.

Figure 5:
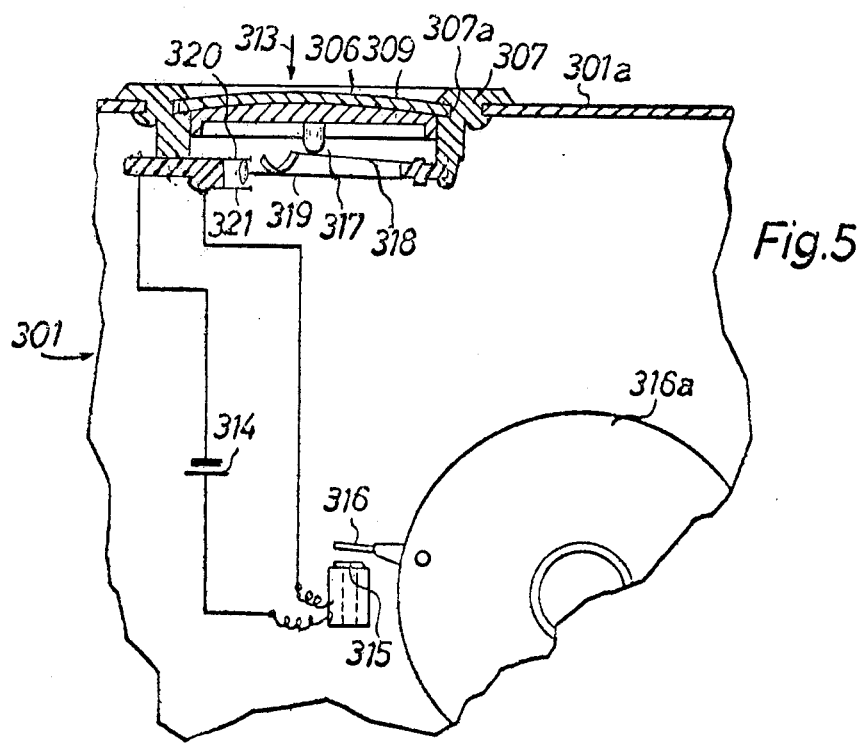
FIG. 5 is a fragmentary vertical sectional view of a fourth camera wherein the back support can close a microswitch in response to deformation of the diaphragm.

Referring finally to FIG. 5, there is shown a photographic camera which embodies the features of the cameras shown in FIGS. 1–2 and 3. The housing or body 301 has a top wall 301a which has an opening receiving an annular socket 307 provided with an internal groove 307a for the marginal portion of a concavo-convex diaphragm 306. A reciprocable disk-shaped metallic back support 309 in the socket 307 has a convex external surface which bears against the concave internal surface of the diaphragm 306. A motion transmitting pin 317 extends inwardly from the central portion of the back support 309 and serves as a trip to close a microswitch including contacts 119–120, 121 in response to slight pressure applied against the diaphragm 306 in the direction indicated by arrow 313. The microswitch 319–320, 321 is in circuit with an energy source 314 and with an electromagnet 315 which can attract a lever 316 of the shutter 316a. The pin 317 is biased upwardly, as viewed in FIG. 5, by a leaf spring 318 which is mounted on the socket 307. The portion 320 of the movable contact 319– 320 tends to move downwardly toward the second contact 321 and the two contacts are in current-conducting engagement with each other when the leaf spring 318 is deformed in response to depression of the central portion of the diaphragm 306. When the pressure upon the diaphragm 306 is terminated, the spring 318 returns to the position shown in FIG. 5 and the microswitch is open because the portion 319 of the movable contact 319–320 moves away from the contact 321.

An important advantage of back supports 109, 209, 309 shown in FIGS. 3 to 5 is that they protect the respective diaphragms 106, 206, 306 against excessive deformation if the operator fails to apply pressure against the central portion of the diaphragm.

It is clear that the diaphragm can be used to move one or more parts which form part of a mechanical motion transmitting assembly (FIGS. 3 and 4) and which simultaneously actuate one or more microswitches (FIGS. 1–2 and 5). Furthermore the diaphragm need not be mounted on the top wall of the camera housing; for example, it can be provided on the front wall or on another side wall.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptions should and are intended to be comprehended within the meaning and range of equivalence of the claims.

What is claimed as new and desired to be protected by letters patent is set forth in the appended:

1. In a photographic camera, a combination comprising a housing; a camera mechanism mounted in said housing and comprising a motion receiving portion movable between first and second positions; operating means for moving said motion receiving portion, comprising a substantially plane flexible diaphragm mounted on said housing and being deformable from a first position to a second position to thereby effect a movement of said motion receiving portion between said first and second positions of said motion receiving portion, said diaphragm having a central portion and said first and second positions of said diaphragm being separated by a distance which is sufficiently small to produce no appreciable camera shake at slow shutter speeds; and stop means mounted in said housing to limit the extent of deformation of said diaphragm, said stop means being adjacent to said central portion at one side of said diaphragm and being adjustable with reference to said diaphragm in directions toward and away from said one side.

2. In a photographic camera, a combination comprising a housing; a camera mechanism mounted in said housing and comprising a motion receiving portion movable between first and second positions; operating means for moving said motion receiving portion, comprising a substantially plane flexible diaphragm mounted on said housing and being deformable from a first position to a second position to thereby effect a movement of said motion receiving portion between said first and second positions of said motion receiving portion, said first and second positions of said diaphragm being separated by a distance which is sufficiently small to produce no appreciable camera shake at slow shutter speeds; a substantially rigid back support adjacent to one side of said diaphragm and being displaceable in said housing in response to the application of deforming pressure against the other side of said diaphragm to thereby effect said movement of said motion receiving portion; and means for yieldably biasing said back support against said one side of said diaphragm through the intermediary of said motion receiving portion.

3. In a photographic camera, a combination comprising a housing; a camera mechanism mounted in said housing and comprising a motion receiving portion movable between first and second positions, said mechanism further comprising a lever pivotable in said housing and including an arm which constitutes said motion receiving portion; operating means for moving said motion receiving portion, comprising a substantially plane flexible diaphragm mounted on said housing and being deformable from a first position to a second position to thereby effect a movement of said motion receiving portion between said first and second positions of said motion receiving portion, said first and second positions of said diaphragm being separated by a distance which is sufficiently small to produce no appreciable camera shake at slow shutter speeds; a substantially rigid back support adjacent to one side of said diaphragm and being displaceable in said housing in response to the application of deforming pressure against the other side of said diaphragm to thereby effect said movement of said motion receiving portion; and a motion transmitting member disposed between said back support and said arm, said motion transmitting member being adjustable with reference to and being supported by said arm.

4. In a photographic camera, a combination comprising a housing; a camera mechanism mounted in said housing and comprising a motion receiving portion movable between closely adjacent first and second positions; operating means for moving said motion receiving portion, comprising a substantially plane flexible diaphragm mounted on said housing and being deformable from a first position to a second position in response to the application of a deforming pressure to thereby effect the movement of said motion receiving portion between said first and second positions of said motion receiving portion, said first and second positions of said diaphragm being separated by a distance which is sufficiently small to produce no appreciable camera shake at slow shutter speeds; and stop means mounted in said housing to limit the extent of deformation of said diaphragm, said stop means being adjustable with reference to said diaphragm.

5. In a photographic camera, a combination comprising a housing; a camera mechanism mounted in said housing and comprising a motion receiving portion movable between closely adjacent first and second positions; operating means for moving said motion receiving portion movable between closely adjacent first and second positions; operating means for moving said motion receiving portion, comprising a substantially plane flexible diaphragm mounted on said housing and arranged to undergo minute deformation from a first position to a second position in response to the application of a deforming pressure whereby said deformation of said diaphragm results in a movement of said motion receiving portion between said closely adjacent first and second positions of said motion receiving portion, said first and second positions of said diaphragm being separated by a distance which is sufficiently small to produce no appreciable camera shake at slow shutter speeds; and a substantially rigid back support adjacent to one side of said diaphragm and being displaceable in said housing in response to the application of said deforming pressure against the other side of said diaphragm to thereby effect said movement of said motion receiving portion.

6. A combination as defined in claim 5, further comprising means for yieldably biasing said back support against said one side of said diaphragm.

7. A combination as defined in claim 5, wherein said mechanism comprises a lever which is pivotable in said housing, said lever comprising an arm which constitutes said motion receiving portion.

8. A combination as defined in claim 7, further comprising a motion transmitting member disposed between said back support and said arm.

9. A combination as defined in claim 5, wherein said diaphragm has a surface adjacent to said back support and said back support comprises a surface which is in substantial face-to-face abutment with the surface of said diaphragm in undeformed condition of the diaphragm.

10. A combination as defined in claim 5, wherein said housing comprises a wall supporting said diaphragm and said diaphragm is substantially flush with said wall in undeformed condition thereof.

11. In a photographic apparatus having manually operated release means, particularly a release means which is operative to actuate a shutter, the improvement which consists in that said release means comprises a substantially plane diaphragm having a smooth exposed portion and that said diaphragm is deformable from a first position to a second position, said first and second positions of said diaphragm being separated by a distance which is sufficiently small to produce no appreciable camera shake at slow shutter speeds.

12. In a photographic apparatus having manually operated release means, particularly a release means which is operative to actuate a shutter, the improvement which consists in that said release means comprises a diaphragm having a substantially plane smooth exposed portion and that said diaphragm is deformable from a first to a second position, said first and second positions of said diaphragm being separated by a distance which is sufficiently small to produce no appreciable camera shake at slow shutter speeds.

13. In a photographic apparatus having manually operated release means, particularly a release means which is operable to actuate a shutter, the improvement which consists in that said release means comprises a diaphragm having a substantially plane smooth exposed portion having an outer side and a frame surrounding said exposed portion and extending beyond said outer side, said diaphragm being deformable from a first to a second position and said difrst and second positions of said diaphragm being separated by a distance which is sufficiently small to produce no appreciable camera shake at slow shutter speeds.

14. A combination as defined in claim 5, wherein said back support is a metallic plate and further comprising socket means mounted in said housing to support the marginal portion of said diaphragm and to guide said back support.

15. In a photographic apparatus having a housing including a wall having an outer side and manually operated release means mounted on said housing, particularly a release means which is operable to actuate a shutter, the improvement which consists in that said release means comprises a diaphragm having a substantially plane exposed portion and a frame surrounding said exposed portion and extending beyond the outer side of said wall, said exposed portion of said diaphragm being deformable from a first position to a second position and said first and second positions of said exposed portion of said diaphragm being separated by a distance which is sufficiently small to produce no appreciable camera shake at slow shutter speeds.

16. In a photographic apparatus, a combination comprising a housing; a camera mechanism, particularly a shutter, mounted in said housing and comprising a motion receiving portion movable from a first to a closely adjacent second position; and operating means for moving said motion receiving portion to said second position, comprising a flexible diaphragm mounted on said housing and having a substantially plane exposed portion which is deformable from a first position to a second position to thereby effect a movement of said motion receiving portion from said first to said closely adjacent second position of said motion receiving portion, said first and second positions of said exposed portion of said diaphragm being separated by a distance which is sufficiently small to produce no appreciable camera shake at slow shutter speeds.

17. A combination as defined in claim 16, wherein said exposed portion comprises a circumferentially complete marginal portion and further comprising means for clamping said marginal portion to said housing.

18. A combination as defined in claim 16, further comprising stop means mounted in said housing to limit the extent of deformation of said exposed portion.

19. A combination as defined in claim 16, wherein said housing comprises a wall having an opening and said exposed portion overlies said opening.

20. A combination as defined in claim 19, wherein said exposed portion is substantially flush with said wall is undeformed condition thereof.

21. A combination as defined in claim 16, wherein said camera mechanism comprises a microswitch including a movable contact constituting said motion receiving portion and a second contact which is engaged by said movable contact in response to said minute deformation of said exposed portion.

22. A combination as defined in claim 21, wherein said movable contact abuts directly against one side of said exposed portion.

23. A combination as defined in claim 22, wherein said exposed portion comprises a central portion which abuts against said movable contact.

24. A combination as defined in claim 16, further comprising means for changing the position of said motion receiving portion relative to said diaphragm in the undeformed condition of said diaphragm to thereby select the extent of deformation which is necessary to move said motion receiving portion from said first to said second position.

25. A combination as defined in claim 16, wherein said motion receiving portion includes a lever which is pivotable between said first and second positions and said housing comprises a wall supporting said diaphragm and having an outer side, and further comprising a frame surrounding said diaphragm and extending beyond the outer side of said wall to facilitate the finding of said exposed diaphragm portion without looking at said frame and said wall.

26. A combination as defined in claim 25, wherein said exposed portion of said diaphragm has a smooth external surface.

27. A combination as defined in claim 16, wherein at least said exposed portion of said diaphragm consists of elastomeric material and is mounted on said housing in prestressed condition so that said exposed portion resists said deformation and tends to assume an undeformed position in which said motion receiving portion is free to assume said first position.

28. In a photographic camera, a combination comprising a housing; a camera mechanism mounted in said housing and including a micro-switch having a first contact and a second contact, said first contact being movable between closely adjacent first and second positions to engage and second contact in said second position thereof; operating means for moving said first contact, comprising a substantially plane flexible diaphragm mounted on said housing and being deformable from a first position to a second position to thereby effect a movement of said first contact from said first to said second position of said first contact, said first and second positions of said diaphragm being separated by a distance which is sufficiently small to produce no appreciable camera shake at slow shutter speeds; and a substantially rigid back support adjacent to one side of said diaphragm and having a portion which is displaceable in said housing in response to deformation of said diaphragm from said first to said second position to thereby effect said movement of said first contact from said first to said second position of said first contact, said diaphragm being deformable in response to the application of deforming pressure against the other side thereof.

29. In a photographic apparatus having a housing including a wall having an outer side and manually operated release means mounted in said housing, particularly a release means which is operable to actuate the shutter, the improvement which consists in that said release means comprises a diaphragm having a substantially plane, deformable and substantially smooth exposed portion, and a frame surrounding said exposed portion, said exposed portion being mounted in said frame and said frame being mounted in said wall so that said exposed portion of said diaphragm is accessible and deformable at the outer side of said wall, said exposed portion of said diaphragm being deformable from a first position to a second position, said first and second positions of said exposed portion being separated by a distance which is sufficiently small to produce no appreciable camera shake at slow shutter speeds.

30. The improvement as defined in claim 29, wherein said exposed portion has an outer side and said frame extends outwardly beyond at least one of said outer sides.

31. In a photographic apparatus having a housing including a wall having an outer side and manually operated release means mounted in said housing, particularly a release means which is operable to actuate the shutter, the improvement which consists in that said release means comprises a diaphragm including a substantially plane exposed portion having a marginal portion, a first side and a second side, mounting means for securing said marginal portion of said exposed portion to said wall so that said first surface of said exposed portion is accessible at said outer side of said wall, said exposed portion of said diaphragm being deformable from a first position to a second position and said first and second positions of said exposed portion being separated by a distance which is sufficiently small to produce no appreciable camera shake at slow shutter speeds, and motion transmitting means adjacent to said second surface of said exposed portion and being displaceable in said housing in response to deformation of said exposed portion from said first position to said second position to effect the operation of said release means, said exposed portion of said diaphragm being deformable from said first position to said second position in response to the application of a deforming stress to any one of several portions of said first surface located at different distances from said marginal portion.

* * * * *